(No Model.)
W. CLEMSON.
VELOCIPEDE.
No. 324,536. Patented Aug. 18, 1885.
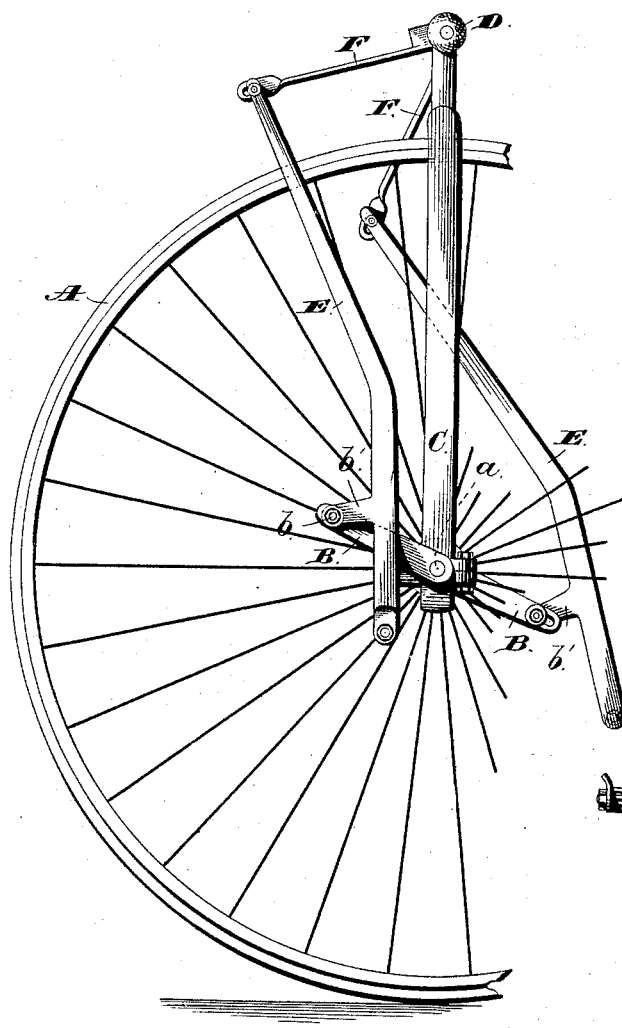
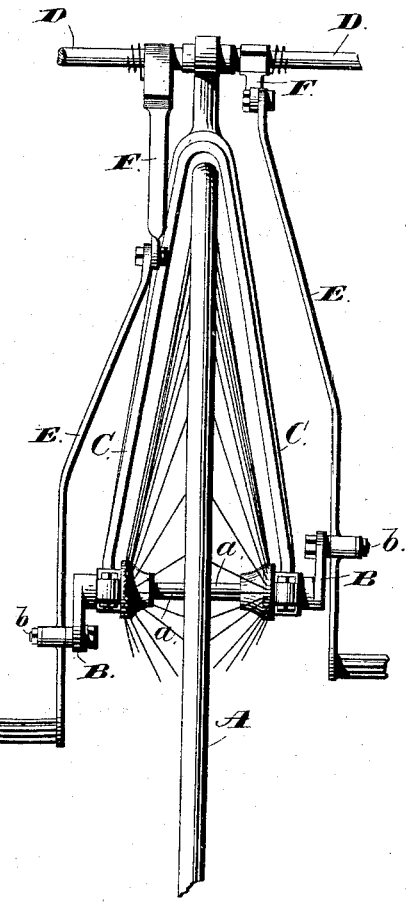
WITNESSES
Jas. E. Hutchinson.
Geo. F. Downing
INVENTOR
William Clemson
By H. A. Symmon,
Attorney

United States Patent Office.

WILLIAM CLEMSON, OF MIDDLETOWN, NEW YORK.

VELOCIPEDE.

SPECIFICATION forming part of Letters Patent No. 324,536, dated August 18, 1885.

Application filed June 8, 1885. (No model.)

*To all whom it may concern:*

Be it known that I, WILLIAM CLEMSON, of Middletown, in the county of Orange and State of New York, have invented certain new and useful Improvements in Velocipedes; and I do hereby declare the following to be a full, clear, and exact description of the invention, such as will enable others skilled in the art to which it appertains to make and use the same.

My invention relates to an improvement in velocipedes.

In Letters Patent No. 304,504, granted to me on September 2, 1884, a bicycle was shown and described in which the foot-pedals were pivotally secured on the wrist-pins of the main driving-cranks and the shanks of the pedals were extended forwardly and slightly upwardly, their forward ends being connected with the fork by vibrating arms or connecting-rods. The main object of this construction was to enable the operator to sit farther back on the backbone of the machine, thereby obviating the danger of "headers," and at the same time drive a wheel of undiminished size. Again, in Letters Patent No. 316,009, granted to me on April 21, 1885, a bicycle was shown and described in which the foot-pedals were pivoted in a depending position on the wrist-pins of the main cranks, and provided with upwardly-extending prongs, the upper ends of which were connected by an elastic cord or its equivalent.

The main object of the latter invention was to provide a depending pedal which would admit of the use of a small drive-wheel without cramping the legs of the rider.

The object of my present invention is to provide a bicycle with depending pedals, whereby a small drive-wheel may be used, and to further provide improved means for steadying the depending pedals.

With these ends in view my invention consists in a depending pedal provided with a prolonged upward extension, the upper end of the latter being connected with the frame of the machine by a vibrating lever.

My invention further consists in certain features of construction and combinations of parts, as will be hereinafter described, and pointed out in the claims.

In the accompanying drawings, Figure 1 is a view in side elevation of a portion of a bicycle embodying my invention, and Fig. 2 is a front view of the same.

A represents the drive-wheel; $a$, its axle; B, the cranks, secured to the ends of the axle $a$; C, the fork, and D the handle-bar. A pair of depending pedals, E, are loosely mounted on the wrist-pins $b$ of the cranks B, either by sleeving the pedal-shank directly on the wrist-pin or by providing the shank with a forwardly-projecting arm, $b'$, having a sleeve on its forward end adapted to fit loosely on the wrist-pin. The shanks $e$ of the pedals E are prolonged upwardly to a point nearly or quite in the horizontal plane of the handle-bar D, and their upper ends are connected with the handle-bar by vibrating arms or connecting-rods F. The joint at this juncture of the arms F and the handle-bar may be of the ball-and-socket type; or it may be of the ordinary hinge type, so constructed as to admit of the free vertically-vibrating motion of the arms F. If found desirable, the arms F may be actuated by springs located at the junctures of the arms with the handle-bar, the tension of which would tend to hold the arms F in a normally-horizontal adjustment and at the same time assist the upward strokes of the cranks B. A convenient form of spring for this purpose would be a spiral spring, as shown in Fig. 2. The upward prolongations of the pedal-shanks are preferably nearly or quite straight, and slightly inclined toward the top of the wheel. They serve to steady the pedals when the foot is applied thereto, and when the pedals are in position to receive a forward thrust of the foot the pressure is communicated through the prolongations of the shanks $e$ and the vibrating arms F to the handle-bar, which, being at the top of the machine, tends to hold the small or rear wheel on the ground.

It is evident that slight changes might be resorted to in the form and construction of the several parts described without departing from the spirit and scope of my invention; hence I do not wish to limit myself strictly to the construction herein set forth; but, Having fully described my invention, what I claim as new, and desire to secure by Letters Patent, is—

1. In a velocipede, the combination, with the main axle and cranks secured to its ends, of depending pedals pivoted on the wrist-pins of said cranks and provided with forwardly and inwardly inclined shanks, substantially as described, and vibrating arms connecting the shanks to the main frame at points above the main axle, substantially as set forth.

2. In a velocipede, the combination, with the main axle and the cranks secured on its ends, of depending pedals mounted on the wrist-pins of said cranks and provided with the forwardly and inwardly inclined shanks, and the vibrating arms connecting the upper ends of the pedal-shanks with the handle-bar, substantially as set forth.

In testimony whereof I have signed this specification in the presence of two subscribing witnesses.

WILLIAM CLEMSON.

Witnesses:
  GEO. N. CLEMSON,
  D. L. CONKLING.